United States Patent Office 3,770,840
Patented Nov. 6, 1973

---

3,770,840
CYCLOPROPANE PROCESS
Lawrence H. Shepherd, Jr., Baton Rouge, La., assignor to Ethyl Corporation, Richmond, Va.
No Drawing. Original application July 2, 1970, Ser. No. 52,077, now Patent No. 3,670,001, dated June 13, 1972. Divided and this application Sept. 27, 1971, Ser. No. 184,273
Int. Cl. C07c 5/20
U.S. Cl. 260—666 P
9 Claims

ABSTRACT OF THE DISCLOSURE

Organoaluminum halides in which the aluminum atom carries a substituted allyl carbinyl group or a substituted cyclopropylcarbinyl group are formed by reacting an aluminacyclopent-3-ene moiety with a primary aliphatic monohalide. The resultant organoaluminum halides are versatile intermediates. Hydrolysis yields substituted 1-alkenes and ring substituted methylcyclopropanes, respectively. Novel classes of substituted cyclopropanes are producible in this manner.

REFERENCE TO RELATED APPLICATIONS

This application is a division of my prior copending application Ser. No. 52,077, filed July 2, 1970 now U.S. Pat. No. 3,670,001 issued June 13, 1972.

This invention relates to novel and useful organo-aluminum halides, their synthesis, and their use in the synthesis of a variety of useful end products. This invention also relates to the novel and useful end products producible via the technology of this invention. Other aspects, advantages, features, and embodiments of this invention will be apparent from the ensuing description and appended claims.

BACKGROUND

In copending application Ser. No. 771,651, filed Oct. 29, 1968, now U.S. Pat. No. 3,631,065 issued Dec. 28, 1971 it is shown that nonionic organoaluminum compounds possessing an aluminacycloalkene moiety are produced by causing interaction among aluminum, a conjugated diene and a hydrocarbon aluminum hydride in the presence of a Lewis base capable of complexing with the nonionic organoaluminum compound without undergoing excessive cleavage. For example, when the diene reactant is butadiene or butadiene substituted in the two position or in the two and three positions, the principal product is characterized by the formula:

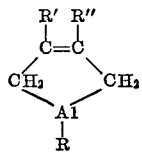

wherein R is a hydrocarbon group having up to about 18 carbon atoms, R' is a hydrogen, alkyl or alkenyl group, and R'' is a hydrogen or alkyl group.

Another method for producing the nonionic organoaluminum compounds possessing an aluminacycloalkene moiety is set forth in copending application Ser. No. 822,046, filed May 5, 1969, now U.S. Pat. No. 3,634,482 issued Jan. 11, 1972. According to that process such compounds are produced by causing interaction among aluminum, a conjugated diene, an alkali metal aluminum tetrahydrocarbyl and hydrogen, the reaction being conducted in the presence of a Lewis base capable of complexing with the nonionic organoaluminum compounds without undergoing excessive cleavage. For example, when using, in this reaction, butadiene or butadiene substituted in the two position, or in the two and three positions, the principal product is characterized by the formula set forth above.

THE INVENTION

Among the discoveries involved in the present invention is the finding that on reacting an organoaluminum compound containing an aluminacycloalkene moiety, notably an aluminacyclopent-3-ene moiety (see the above referred to copending applications) with a primary hydrocarbyl monohalide, new organoaluminum compounds are produced. One class of compounds producible in this manner is an organoaluminum compound having bonded to an aluminum atom a halogen atom and an allylcarbinyl group of the formula:

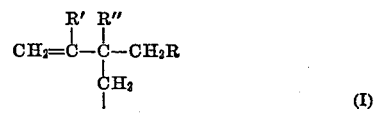
(I)

wherein R, R' and R'' are the same or different and are hydrogen or hydrocarbyl groups.

Another type of compound producible by the foregoing reaction is an organoaluminum compound having bonded to an aluminum atom a halogen atom and a cyclopropylcarbinyl group of the formula:

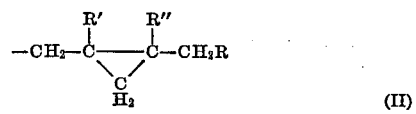
(II)

wherein R, R' and R'' are the same or different and are hydrogen or hydrocarbyl groups.

A further feature of this invention is the discovery that although both of the foregoing classes of compounds tend to be formed as coproducts of the reaction, it is possible to influence the relative proportions thereof by proper selection of the halogen atom present in the primary aliphatic monohalide reactant. Thus, when it is desired to provide a product enriched in the allylcarbinyl substituted compounds, the halogen atom of the monohalide reactant is preferably chlorine. If, on the other hand, it is desired to produce a product enriched in the organoaluminum halide containing the cyclopropylcarbinyl group, it is desirable that the halogen atom of the halide reactant be bromine.

It will thus be seen that this invention provides, inter alia, two general classes of novel organoaluminum halides—those carrying a substituted allylcarbinyl group and those carrying a substituted cyclopropylcarbinyl group. Also, through proper selection of the primary aliphatic monohalide reactant, the invention makes it possible to have either product predominate over the other.

The foregoing embodiments of this invention may be represented by the following equations:

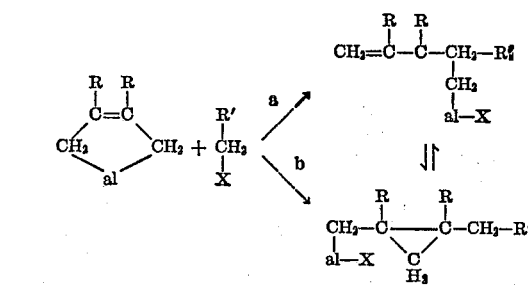

In the above equations "al" represents two-thirds of a chemical equivalent of aluminum, the groups designated by R may be the same or different and are hydrogen or hydrocarbyl groups (preferably hydrogen or lower alkyl groups), the group designated as R' is hydrogen or a suitable organic radical and X is halogen, preferably chlorine, bromine or iodine. In this connection, the third bond of the aluminum atom is satisfied by an innocuous substituent—i.e., a group which does not prevent the specified reaction(s) from occurring. Based on the present state of the art, this innocuous substituent will more often be a hydrocarbyl group or a hydrocarbyl aluminum group, although it is entirely possible that other groups such as halogen, alkoxy or other innocuous groups could be present. As explained in the copending applications referred to above, all disclosures of which are incorporated herein as if fully set forth in this specification, the available experimental evidence tends strongly to indicate that when forming the organoaluminum compounds containing an aluminacyclopent-3-ene moiety, the third bond of the aluminum is satisfied by a hydrocarbyl group corresponding to the hydrocarbon group(s) present in either the hydrocarbon aluminum hydride or the alkali metal aluminum tetrahydrocarbyl used in its synthesis. For example, if the compound containing the aluminacyclopent-3-ene moiety involves diisobutylaluminum hydride in its synthesis, the third bond of the aluminum in the product would be satisfied for the most part by an isobutyl group. By the same taken, if sodium aluminum tetraethyl is used in the synthesis reaction, the organoaluminum compound containing the aluminacyclopent-3-ene moiety would have the third bond of the aluminum atom satisfied in the main by an ethyl group.

As also brought out in the foregoing copending applications, some of the products of the aluminacyclopent-3-ene moiety synthesis are characterized by the formula:

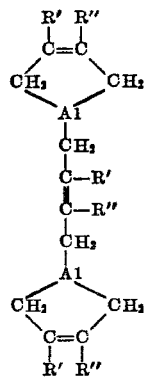

wherein R' is a hydrogen, alkyl or alkenyl group; and R" is a hydrogen, or alkyl group.

For all practical purposes, therefore, the identity of the innocuous group satisfying the third valence bond of the aluminum atom in the aluminacyclopent-3-ene moiety is of academic interest only. Any group which does not interfere with the desired reactions of this invention can be present inasmuch as the reactions themselves are focused upon the aluminacyclopent-3-ene moiety itself. The remainder of the molecule, if innocuous in the sense referred to above, can be considered excess baggage. The same considerations apply to the group satisfying the third valence bond of the aluminum in the organoaluminum halides of this invention—usually this group will correspond to the group present on the aluminum atom of the aluminacyclopent-3-ene reactant.

It will be apparent from the above equations that if the groups designated by R on the aluminacyclopent-3-ene moiety are the same (e.g., they are both hydrogen or they are the same alkyl or alkenyl group), there will be but one isomer of the product involving paths $a$ and $b$. If on the other hand the two R groups differ from each other, there is the tendency for two isomers of each respective product to be formed, this depending upon which of the two allylic carbon atoms of the aluminacyclopent-3-ene participated in the reaction. As a general rule the allylic carbon atom which is least hindered sterically is the favored site of the reaction. By way of example, if one of the groups designated by R is a methyl group and the other R group is hydrogen, the allylic carbon atoms carrying the hydrogen atom participate in the reaction to a greater extent than the allylic carbon atoms carrying the methyl group, although isomers corresponding to both interactions are formed in the reaction product.

As a general proposition the preferred allylcarbinyl organoaluminum halides of this invention are those in which the halogen atom is chlorine. In the case of the organoaluminum compounds of this invention containing a substituted cyclopropylcarbinyl group, the halogen atom is preferably bromine. It will be seen that these preferred compounds ae producible in high yield from readily available and inexpensive primary aliphatic monohalides. It will be recalled that the use of primary hydrocarbyl monochlorides in the reaction tends to favor the formation of the compounds containing the substituted allylcarbinyl group, whereas the use of primary hydrocarbyl monobromides tends to favor formation of the compounds containing the substituted cyclopropylcarbinyl group. In other words, in the equation presented above, if X is chlorine, reaction via route $a$ is enhanced. On the other hand, if X is bromine, reaction via course $b$ is favored.

The organoaluminum halides of this invention are particularly useful as intermediates for the synthesis of other compounds. For example, one aspect of this invention involves the hydrolysis of these compounds in order to produce substituted 1-alkenes:

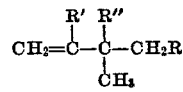

or ring substituted methylcyclopropanes:

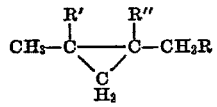

wherein R, R' and R" are the same or different and are hydrogen or suitable organic groups such as hydrocarbyl groups. It will, of course, be understood that both types of these compounds may be readily formed by hydrolyzing a mixture of both types of organoaluminum halides of this invention.

Thus, in another of its embodiments this invention provides a process of producing a substituted olefin or a substituted cyclopropane, or both, which comprises reacting an organolaluminum compound containing an aluminacyclopent-3-ene moiety with a primary aliphatic monohalide (preferably one in which the halogen atom is chlorine, bromine or iodine) and hydrolyzing the organoaluminum halide product so obtained.

Another remarkable feature of this invention is the discovery that the temperature of the hydrolysis reaction often affects the relative proportions of the substituted 1-alkenes and ring substituted methylcyclopropanes produced. In particular, it has been discovered that when hydrolyzing a given system containing both types of organoaluminum halides of this invention (i.e., a compound containing the allylcarbinyl group and a compound containing the corresponding cyclopropylcarbinyl group), hydrolysis at low temperatures tends to promote an increased proportion of the substituted 1-alkene relative to the ring substituted methylcyclopropane. On the other hand, hydrolysis at higher temperatures tends to promote an increased proportion of the ring substituted methylcyclopropane relative to the substituted 1-alkene. Thus, another embodiment of this invention involves producing a substituted olefin or a substituted cyclopropane, or both, by reacting an aluminacyclopent - 3 - ene moiety with a primary aliphatic monohalide and hydrolyzing the organoaluminum halide product so obtained at a temperature sufficiently low to enhance the proportion of the substituted olefin relative to the substituted cyclopropane. Still another embodiment of this invention involves carrying out this same process wherein the hydrolysis is effected at a temperature sufficiently high to enhance the proportion of the substituted cyclopropane relative to the substituted olefin.

The foregoing reactions provide the art with two classes of cyclopropane derivatives for which no synthesis was apparently known heretofore. One such class of compounds is a substituted cyclopropane having the formula:

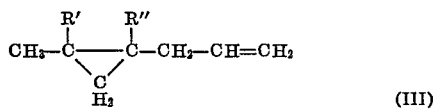

(III)

wherein R' and R'' are the same or different and are hydrogen, alkyl or alkenyl groups. The other class is a substituted cylclopropane having the formula:

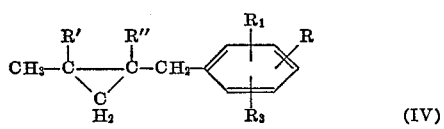

(IV)

wherein R' and R'' are the same or different and are hydrogen, alkyl or alkenyl groups, and $R_1$, $R_2$ and $R_3$ are the same or different and are hydrogen, halogen, alkyl, alkenyl, cycloalkyl, aryl or alkoxy groups. The allyl substituted cyclopropanes of Formula III above can be readily polymerized with ethylene, propylene, combinations of ethylene and propylene, and with other alphaolefin monomers to produce high molecular weight polymers having novel and useful properties. The technology for effecting such polymerizations is well known to those skilled in the art and is based upon the original discoveries by Ziegler and his colleagues and Natta and his colleagues. In addition, these compounds may be used or converted into insecticides, germicides and fungicides. The cyclopropanes depicted by Formula IV above may be used as insecticides, fungicides, bactericides, miticides, watermark detecting agents, and as special purpose solvents where the combination in the same molecule of cycloparaffinicity and aromaticity is of advantage.

As noted above the hydrolysis of the organoaluminum halide compounds of this invention makes possible the synthesis of a very large number of end products. Some appreciation of the products which may be readily obtained in this manner can be gained by reference to the illustrative examples set forth in the ensuing table. The table sets forth the aluminacyclopent-3-ene moiety of the initial organoaluminum reactant, the primary aliphatic monohalide reactant, the substituted allylcarbinyl group and the substituted cyclopropylcarbinyl group of the organoaluminum halides produced from these reactants, and the products produced upon hydrolysis of these intermediates.

TABLE

| Aluminacyclopent-3-ene moiety | Primary aliphatic monohalide reactant | Substituted allylcarbinyl aluminum halide moiety and substituted cyclopropylcarbinyl aluminum halide moiety | Substituted 1-alkene and substituted methylcyclopropane (hydrolysis product from Column 3) |
|---|---|---|---|
| al | $CH_3Cl$ | $CH_2=CHCHCH_3$<br>$\|$<br>$CH_2$<br>$\|$<br>$alCl$ | 3-methyl-1-butene. |
| | | $CH_2-CH\!-\!-\!CH-CH_3$<br>$\|\quad\quad\diagdown\diagup$<br>$alCl\quad\;\; CH_2$ | 1,2-dimethylcyclopropane. |
| al | $n\text{-}C_8H_{17}I$ | $CH_2=CHCH(CH_2)_7CH_3$<br>$\|$<br>$CH_2$<br>$\|$<br>$alI$ | 3-methyl-1-undecene. |
| | | $CH_2-CH\!-\!-\!CH(CH_2)_7CH_3$<br>$\|\quad\quad\diagdown\diagup$<br>$alI\quad\;\; CH_2$ | 1-methyl-2-octylcyclopropane. |
| al | ⬡-$CH_2Br$ | $CH_2=CHCHCH_2$–⬡<br>$\|$<br>$CH_2$<br>$\|$<br>$alBr$ | 3-methyl-4-cyclopentyl-1-butene. |
| | | $CH_2-CH\!-\!-\!CHCH_2$–⬡<br>$\|\quad\quad\diagdown\diagup$<br>$alBr\quad\;\; CH_2$ | 1-methyl-2-cyclopentylcarbinylcyclopropane. |
| al | $CH_2=CH(CH_2)_4Br$ | $CH_3$<br>$\|$<br>$CH_2=CCH(CH_2)_4CH=CH_2$<br>$\|$<br>$CH_2$<br>$\|$<br>$alBr$ | 2,3-dimethyl-1,8-nonadiene. |
| | | $CH_3$<br>$\|$<br>$CH_2-C\!-\!-\!CH(CH_2)_4CH=CH_2$<br>$\|\quad\quad\diagdown\diagup$<br>$alBr\quad\;\; CH_2$ | 1,1-dimethyl-2-(hex-5-enyl)-cyclopropane. |
| | | $C_2H_5$<br>$\|$<br>$CH_2=CHC(CH_2)_4CH=CH_2$<br>$\|$<br>$CH_2$<br>$\|$<br>$alBr$ | 3,3-diethyl-1,8-nonadiene. |
| | | $CH_3$<br>$\|$<br>$CH_2-CH\!-\!-\!C(CH_2)_4CH=CH_2$<br>$\|\quad\quad\diagdown\diagup$<br>$alBr\quad\;\; CH_2$ | 1,2-dimethyl-2-(hex-5-enyl)-cyclopropane. |
| al | $CH_2=CHCH_2F$ | $CH_3$<br>$\|$<br>$CH_2=CCHCH_2CH=CH_2$<br>$\|$<br>$CH_2$<br>$\|$<br>$alF$ | 2,3-dimethyl-1,5-hexadiene. |

| Aluminacyclopent-3-ene moiety | Primary aliphatic monohalide reactant | Substituted allylcarbinyl aluminum halide moiety and substituted cyclopropylcarbinyl aluminum halide moiety | Substituted 1-alkene and substituted methylcyclopropane (hydrolysis product from Column 3) |
|---|---|---|---|
| (aluminacyclopent-3-ene) | $CH_2=CHCH_2F$ | $CH_2-\underset{\underset{alF}{\mid}}{\overset{\overset{CH_3}{\mid}}{C}}-\overset{\mid}{\underset{\mid}{CH_2}}-CHCH_2CH=CH_2$ | 1,1-dimethyl-2-allylcyclopropane. |
| | | $CH_2=CHC(CH_3)(CH_2alF)CH_2CH=CH_2$ | 3,3-dimethyl-1,5-hexadiene. |
| | | $CH_2-CH(alF)-C(CH_3)(CH_2)CH_2CH=CH_2$ | 1,2-dimethyl-2-allylcyclopropane. |
| (aluminacyclopent-3-ene) | $CH_3CH_2OCH_2Cl$ | $CH_2=C(CH_3)(CH_2alCl)CH_2OC_2H_5$ | $CH_2=C(CH_3)CH(CH_3)CH_2OC_2H_5$ |
| | | $CH_2-C(CH_3)(alCl)-CH(CH_2)CHCH_2OC_2H_5$ | $CH_3C(CH_3)-CH(CH_2)CHCH_2OC_2H_5$ |
| | | $CH_2=CHC(CH_3)(CH_2alCl)CH_2OC_2H_5$ | $CH_2=CHC(CH_3)(CH_3)CH_2OC_2H_5$ |
| | | $CH_2-CH(alCl)-C(CH_3)(CH_3)CH_2OC_2H_5$ | $CH_3CH-C(CH_3)(CH_2)CH_2OC_2H_5$ |
| (aluminacyclopent-3-ene) | $CH_2=CHCH_2Br$ | $CH_2=C(CH_3)-C(CH_3)(CH_2alBr)CH_2CH=CH_2$ | 2,3,3-trimethyl-1,5-hexadiene. |
| | | $CH_2-C(CH_3)(alBr)-C(CH_3)(CH_2)CH_2CH=CH_2$ | 1,1,2-trimethyl-2-allylcyclopropane. |
| (aluminacyclopent-3-ene) | $Br-C_6H_4-CH_2Cl$ | $CH_2=C(CH_3)-C(CH_3)(CH_2alCl)CH_2-C_6H_4-Br$ | 2,3,3-trimethyl-4-(p-bromophenyl)-1-butene. |
| | | $CH_2-C(CH_3)(alCl)-C(CH_3)(CH_2)CH_2-C_6H_4-Br$ | 1,1,2-trimethyl-2-(p-bromobenzyl)-cyclopropane. |
| (aluminacyclopent-3-ene) | $CH_3Br$ | $CH_2=C(CH_3)-C(CH_3)(CH_2alBr)CH_3$ | 2,3,3-trimethyl-1-butene. |
| | | $CH_2-C(CH_3)(alBr)-C(CH_3)(CH_2)CH_3$ | 1,1,2,2-tetramethylcyclopropane. |
| (geranyl aluminacycle) | $C_2H_5I$ | (CH_2=C(CH_2alI)(C_2H_5)... structure with isopropenyl) | (corresponding alkene with C_2H_5) |

TABLE—Continued

| Aluminacyclopent-3-ene moiety | Primary aliphatic monohalide reactant | Substituted allylcarbinyl aluminum halide moiety and substituted cyclopropylcarbinyl aluminum halide moiety | Substituted 1-alkene and substituted methylcyclopropane (hydrolysis product from Column 3) |
|---|---|---|---|

TABLE—Continued

| Aluminacyclopent-3-ene moiety | Primary aliphatic monohalide reactant | Substituted allylcarbinyl aluminum halide moiety and substituted cyclopropylcarbinyl aluminum halide moiety | Substituted 1-alkene and substituted methylcyclopropane (hydrolysis product from Column 3) |
|---|---|---|---|

[Chemical structures not transcribed as text]

| Aluminacyclopent-3-ene moiety | Primary aliphatic monohalide reactant | Substituted allylcarbinyl aluminum halide moiety and substituted cyclopropylcarbinyl aluminum halide moiety | Substituted 1-alkene and substituted methylcyclopropane (hydrolysis product from Column 3) |
|---|---|---|---|
| $C_2H_5$-aluminacyclopentene | $\underset{O}{\triangleleft}$—$CH_2Cl$ | $CH_2=CH\underset{CH_2}{\overset{C_2H_5}{C}}CH_2-\underset{alCl}{\triangleleft O}$ | $CH_2=CH\underset{CH_3}{\overset{C_2H_5}{C}}CH_2-\triangleleft O$ |
| | | $\underset{alCl}{CH_2-CH}\overset{C_2H_5}{\underset{CH_2}{\diagdown C \diagup}}CH_2-\triangleleft O$ | $CH_3CH\overset{C_2H_5}{\underset{CH_2}{\diagdown C \diagup}}CH_2-\triangleleft O$ |
| $C_2H_5$-aluminacyclopentene | $\underset{Br}{\bigtriangledown}$ | $CH_2=\underset{CH_2}{\overset{C_2H_5}{C}}-CH-\underset{ClBr}{\triangleleft}$ | $CH_2=\overset{C_2H_5}{\underset{CH_3}{C}}-CH-\triangleleft$ |
| | | $\underset{alBr}{CH_2-\overset{C_2H_5}{C}}\underset{\diagdown CH_2 \diagup}{}CH-\triangleleft$ | $CH_3\overset{C_2H_5}{\underset{\diagdown CH_2 \diagup}{C}}CH-\triangleleft$ |
| | | $CH_2=CH\underset{alBr}{\overset{C_2H_5}{\underset{CH_2}{C}}}-\triangleleft$ | $CH_2=CH\overset{C_2H_5}{\underset{CH_3}{C}}-\triangleleft$ |
| | | $\underset{alBr}{CH_2-CH}\overset{C_2H_5}{\underset{\diagdown CH_2 \diagup}{C}}-\triangleleft$ | $CH_3CH\overset{C_2H_5}{\underset{\diagdown CH_2 \diagup}{C}}-\triangleleft$ |

The organoaluminum halides of this invention are generally soluble in conventional hydrocarbon solvents such as benzene or toluene, and since they are usually formed in the presence of a Lewis base such as an ether they normally are complexed therewith. These complexes, especially when the Lewis base is a tertiary amine, dialkyl ether, cycloparaffinic monoether having a six membered ring or cycloparaffinic diether having a five or six membered ring, constitute preferred embodiments of this invention. It is convenient and preferred to synthesize these organoaluminum halides in 1,4-dioxane and thus the 1,4-dioxanate complexes of the organoaluminum halides of this invention constitute a preferred embodiment.

As is evident from the table presented above, a wide variety of primary organic monohalides may be used as reactants in forming the novel organoaluminum halides of this invention. These reactants may be depicted by the general formula $$RCH_2X$$

where R is a suitable organic radical and X is halogen (F, Cl, Br, I). The preferred primary aliphatic monohalides of this type are the primary hydrocarbyl monohalides, especially those in which the halogen atom is chlorine, bromine or iodine. Nevertheless, this reactant may be substituted with innocuous substituents—i.e., substituents which do not prevent the desired reaction(s) from occurring. For example, the presence in the primary organic monohalide of additional halogen atoms attached to tertiary carbon atoms or to an aromatic ring is not harmful as these additional halogen atoms will not adversely affect the reaction. By the same token, the presence in the organic portion of the molecule (R in the formula presented in this paragraph) of trialkylsilyl, triarylsilyl, and like trihydrocarbyl silane groups; ether oxygen atoms (e.g., alkoxy, aryloxy, and related groups); or thioether sulfur atoms is permissible, these constituting typical examples of innocuous substituents in the sense used herein. Accordingly, the reaction may involve use of such compounds as the methyl halides, ethyl halides, n-butyl halides, isobutyl halides, 2-ethylhexyl halides, n-octadecyl halides, crotonyl halides, 8-halo-1-octenes, 8-halo-2-octenes, 2-halo-3-octenes, 8-halo-4-octenes, 7-halo-1-heptynes, benzyl and phenethyl halides (including those in which the ring carries substituents such as halogen, alkyl, alkenyl, cycloalkyl, aryl, alkoxy, aryloxy, silyl groups, etc.), primary monohaloethers and thioethers and the like. It will be seen that these various reactants are characterized by containing a monohalocarbinyl group.

Particularly preferred primary aliphatic monohalide reactants include methyl bromide, methyl chloride, methyl iodide, allyl chloride, allyl bromide, allyl iodide, benzyl chloride, benzyl bromide, benzyl iodide, propargyl chloride, propargyl bromide and propargyl iodide. It will be seen that the use of the methyl halide results in R in Formulas I and II above being hydrogen. Similarly the allyl halides result in R in Formulas I and II being vinyl whereas it is phenyl when using the benzyl halides. The propargyl halides give rise to the formation of compounds in which R of Formulas I and II is ethynyl.

Reaction between the aluminacyclopent-3-ene moiety and the primary aliphatic monohalide coreactive therewith is conducted in the presence of a Lewis base having suitable chemical stability under the reaction conditions being utilized. In most cases this Lewis base will be employed as the principal reaction solvent—i.e., the reaction will be conducted in the Lewis base selected for use. However, if desired, the reaction may be effected in a suitable inert hydrocarbon medium (e.g., paraffinic or aromatic hydrocarbon solvents such as hexane, heptane, octane, decane, cyclohexane, benzene, toluene, xylenes, and the like) provided a suitable amount of the Lewis base is also present in the reaction system. Ordinarily the system should contain at least 1–2 mols of Lewis base per equivalent of aluminacyclopent-3-ene moiety employed. Particularly convenient Lewis bases for use in the process are tertiary amines (e.g., trimethyl amine, dimethylethyl amine, triethyl amine, tributyl amine, triphenyl amine, tribenzyl amine, benzyldimethyl amine, N-methyl morpholine, N,N-diethyl aniline, N,N,N′,N′-tetramethyl methylene diamine, N,N,N′,N′-tetramethyl ethylene diamine, pyridine, N-methyl pyrrolidine, triethylene diamine, quinuclidine, and the like); dialkyl ethers (e.g., dimethyl ether, diethyl ether, diisopropyl ether, methylisoamyl ether, dibutyl ether, dihexyl ether and the like); cycloparaffinic monoethers having a six membered ring (e.g., tetrahydropyran—pentamethylene oxide—and ring alkylated derivatives thereof); and cycloparaffinic diethers having a five or six membered ring (e.g., 1,4-dioxane, 1,3-dioxolane, 2-methyl-2-ethyl-1,3-dioxolane; and the like); and other similar substances which tend not to be excessively cleaved in the reaction, such as dicyclohexyl ether, dibenzyl ether, and the like.

The relative proportions of the reactants and reaction diluents do not appear to be critical as long as there is present a sufficient amount of each reactant to participate in the reaction. However, for best results it is desirable to employ at least a stoichiometric quantity of the primary aliphatic monohalide per equivalent of aluminacyclopent-3-ene moiety present in the system. When the monohalide is introduced in the vapor state it is convenient to employ an excess relative to the aluminacyclopent-3-ene moiety.

In conducting the process for producing the organoaluminum halides of this invention, elevated temperatures are employed. Generally, temperatures within the range of about 100° C. to about 180° C. will be found satisfactory, temperatures within the range of about 110° to about 140° C. being preferred. Naturally, one should select a reaction temperature at which the reaction proceeds at a satisfactory rate without encountering excessive adverse side reactions such as thermal decomposition, undesired cleavage reactions, undesired double bond isomerizations or the like.

Ordinarily the reaction will be conducted at atmospheric pressure or at the ambient pressures which prevail when conducting the reaction in a closed reaction vessel. However when using some of the lower boiling primary organic halide reactants, it is desirable to conduct the reaction at a high enough pressure to insure intimate contact between the reactants in the system. Thus, pressures up to about 50 atmospheres or more may be employed where desirable or convenient.

In performing the hydrolysis reaction in accordance with this invention, use may be made of a wide variety of suitable hydrolysis reagents. Thus, use may be made of water, dilute mineral acids (e.g., HCl, $H_2SO_4$, $H_3PO_4$, etc.), dilute aqueous bases (e.g., dilute KOH, dilute NaOH, aqueous $NH_4OH$, etc.), aqueous solutions of ammonium chloride, and the like. Hydrolysis temperatures are normally within the range of from about $-10°$ C. up to about 100° C. although any suitable temperature may be selected. As noted above, the temperature employed in the hydrolysis reaction should take into consideration the discovery that low temperatures within this range tend to provide an increased proportion of the substituted olefin relative to the substituted cyclopropane. Conversely as the temperatures are increased within this range there is a tendency for the proportion of the substituted cyclopropane to be increased at the expense of the substituted olefin. Thus, it will be found helpful to perform a few pilot experiments to ascertain the optimum hydrolysis temperature for use in any given situation.

In order to still further appreciate the practice and advantages of this invention reference should be had to the following illustrative examples.

Example I.—Reaction between the 3-methylaluminacyclopent-3-ene moiety and allyl bromide followed by hydrolysis Treatment of 36 mmoles of 3-methylaluminacyclopent-3-ene moiety in 50 ml. of 1,4-dioxane with 58 mmoles of allyl bromide for two hours at 135° C. followed by vacuum removal of the solvent at room temperature resulted in a non-volatile liquid. The liquid was dissolved in 150 ml. diethyl ether and hydrolyzed at 0° C. using $H_2O$ followed by dilute HCl. Work-up consisted of washing several times with $H_2O$, once with dilute $NaHCO_3$, then with $H_2O$, and drying with $MgSO_4$. The solvent was carefully removed by evaporation through an 18″ Vigreux column using an $H_2O$ bath with a maximum temperature of 65° C. Careful distillation resulted in the isolation of a main cut (2.6 g.) boiling at 101–103° C. Four compounds were present by VPC analysis ($\beta,\beta'$-oxydipropionitrile column, 20′ x ¼″) in addition to a small amount of diethyl ether and dioxane. Mass spectrographic analysis of the four compounds showed them to be isomeric $C_8H_{14}$ hydrocarbons. After removal of all of the diethyl ether and most of the dioxane by preparative VPC techniques, the four compounds were resolved into two fractions by the $\beta,\beta'$-oxydipropionitrile column. The first fraction contained the most material and NMR analysis showed that this fraction contained a mixture of 1-allyl-2,2-dimethylcyclopropane and 1-allyl-1,2-dimethylcyclopropane with the latter being present only to a small extent. The second fraction consisted of a mixture of 2,3-dimethyl-1,5-hexadiene and 3,3-dimethyl-1,5-hexadiene. It was found that these four compounds had been formed in the following proportions:

| | Percent |
|---|---|
| 1-allyl-2,2-dimethylcyclopropane | 70 |
| 1-allyl-2,2-dimethylcyclopropane | 10 |
| 2,3-dimethyl-1,5-hexadiene | 15 |
| 3,3-dimethyl-1,5-hexadiene | 5 |

These $C_8H_{14}$ hydrocarbons were obtained in at least 66% yield based on the 3-methylaluminacyclopent-3-ene moiety. The organoaluminum halides produced in the course of this experiment contained the moieties:

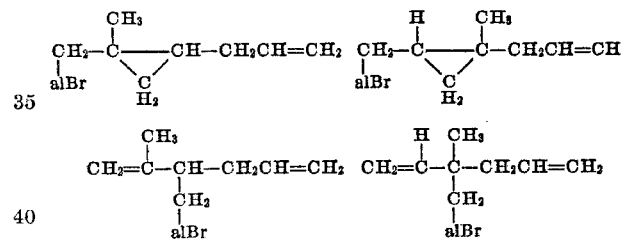

Example II.—Reaction between the 3-methylaluminacyclopent-3-ene moiety and allyl chloride followed by hydrolysis The procedure of Example I was repeated under essentially the same conditions except that a corresponding amount of allyl chloride was employed as the halide reactant. The same four $C_8H_{14}$ products were obtained. However in this instance the product contained somewhat less than 25% of the dimethylallylcyclopropanes and somewhat more than 75% of the dimethyl-1,5-hexadienes.

Example III.—Reaction between the 3-methylaluminacyclopent-3-ene moiety and allyl iodide followed by hydrolysis Repetition of the procedure of Example I utilizing allyl iodide as the monohalide reactant produced the same four $C_8H_{14}$ products. In this case 41% of the total product was the dimethylallylcyclopropane isomers and 59% the dimethyl-1,5-hexadienes.

Since in all of the experiments of Examples I–III inclusive the reaction and work-up conditions were quite similar, it can be seen that the use of the allyl bromide definitely tends to lead to cyclic products whereas with the allyl chloride and allyl iodide the non-cyclic products predominate.

Example IV.—Reaction between the 3-methylaluminacyclopent-3-ene moiety and benzyl chloride followed by hydrolysis Reaction of benzyl chloride with the 3-methylaluminacyclopent-3-ene moiety in 1,4-dioxane at 135° C. followed by hydrolysis resulted in the formation of a mixture containing about 77%, 2,3-dimethyl-4-phenylbutene, about 15% of 3,3-dimethyl-4-phenyl-1-butene, the balance being predominantly cyclopropyl $C_{12}H_{16}$ isomers (benzyl-dimethylcyclopropane isomers).

Example V.—Reaction between the 3-methylaluminacyclopent-3-ene moiety and benzyl bromide followed by hydrolysis When benzyl bromide was allowed to react with the 3-methylaluminacyclopent-3-ene moiety in 1,4-dioxane at 135° C., the hydrolysis products contained approximately 45% of two isomeric benzyl-substituted cyclopropanes (mostly 1-benzyl-2,2-dimethylcyclopropane along with 1-benzyl-1,2-dimethylcyclopropane) and about 55% of open chain isomers, viz, 1-phenyl-2,3-dimethyl-1-butene and 1-phenyl-3,3-dimethyl-1-butene, with the former predominating.

A comparison of the results of Examples IV and V shows that the use of the benzyl chloride resulted in the formation of the open chain isomers almost exclusively. On the other hand, benzyl bromide gave 55% of the open chain isomers and 45% of the substituted cyclopropanes. Consequently this is another indication that the bromide reactants tend to produce a higher proportion of the substituted cyclopropane derivatives than do the chloride reactants.

Example VI.—Reaction between the 3-methylaluminacyclopent-3-ene moiety and methyl bromide followed by hydrolysis Methyl bromide and 3-methylaluminacyclopent-3-ene moiety were heated together at 110° C. for 12 hours. Aliquots of the reaction product were hydrolyzed at different temperatures and isomeric $C_6H_{32}$ compounds were liberated. These were identified by NMR and VPC retention as 1,1,2-trimethylcyclopropane and 2,3-dimethyl-1-butene, with perhaps a small quantity of 3,3-dimethyl-1-butene being present. These had been produced in a yield considerably above 50% based on the 3-methylaluminacyclopent-3-ene moiety. From these hydrolysis studies it was discovered that the relative amounts of the open chain isomer and the cyclic isomer liberated was dependent on the temperatures of the hydrolysis mixture as shown by the following tabulation:

| Approximate hydrolysis temperature, °C. | Percentage of— | |
|---|---|---|
| | 1,1,2-trimethylcyclopropane | 2,3-dimethyl-1-butene |
| 0 | 30 | 70 |
| 25 | 52 | 48 |
| 60-70 | 77 | 23 |

These results indicate that the ratio of open chain to cyclopropyl products can be controlled since it is temperature dependent, the cyclopropyl product predominating at the higher temperature.

Illustrative allylcyclopropanes of this invention (Formula III above) include:

1-allyl-2-methylcyclopropane
1-allyl-2,2-dimethylcyclopropane
1-allyl-1,2-dimethylcyclopropane
1-allyl-1,2,2-trimethylcyclopropane
1-allyl-2-ethyl-2-methylcyclopropane
1-allyl-2-ethyl-2-methylcyclopropane
1-allyl-2-octyl-2-methylcyclopropane
1-allyl-2-(4-methyl-3-pentenyl)-2-methylcyclopropane Exemplary benzyl-substituted cyclopropanes of this invention (Formula IV above) are:

1-benzyl-2-methylcyclopropane
1-(2,5-dichlorobenzyl)-2-methylcyclopropane
1-(4-butoxybenzyl)-2-methylcyclopropane
1-(4-methylbenzyl)-2,2-dimethylcyclopropane
1-benzyl-1,2,2-trimethylcyclopropane
1-(4-bromobenzyl)-2-ethyl-2-methylcyclopropane
1-benzyl-2-hexyl-2-methylcyclopropane
1-benzyl-2-(4-methyl-3-pentenyl)-2-methylcyclopropane Although this invention has been described with reference to the use of primary aliphatic monohalides as the reactant it may be found possible to use secondary aliphatic monohalides, especially where the halogen atom is not excessively hindered sterically and where the halogen atom is activated through proximity to a suitable functional group such as an ether oxygen atom.

Among the uses for the organoaluminum halide products of this invention is their suitability as catalysts for synthesis reactions. For example, these products may be used in forming catalyst systems to be employed in the same general fashion as the conventional Ziegler and Natta catalyst systems. By way of example, these organoaluminum halides may be used in conjunction with conventional transition metal containing catalyst ingredients (e.g., the halides, alkoxides, or chelates of titanium, zirconium, vanadium or the like) in much the same way as alkyl aluminum compounds are now used. Polymers which may be produced in this manner include polyethylene, polypropylene, ethyl-propylene copolymers and terpolymers, poly-4-methylpentene-1, polyvinylchloride and other olefin polymers and synthetic rubbers or elastomers.

Another important use for the organoaluminum halides of this invention is to subject them to controlled oxidation with air, oxygen or air enriched with gaseous oxygen whereby new classes of organic aluminum halides are produced. By way of example, oxidation (air, 0° C., 1 hour, in 1,4-dioxane) of compounds of the general formula

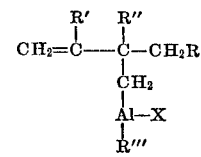

gives rise to the formation of compounds of the formula:

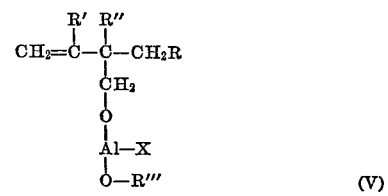

wherein R, R' and R" are the same or different and are hydrogen or hydrocarbyl groups generally containing up to about 18 carbon atoms each; R''' is a hydrocarbon group having up to about 18 carbon atoms (most preferably a lower alkyl group); and X is a halogen atom, preferably Cl, Br, or I.

Similarly controlled oxidation of a compound of the formula

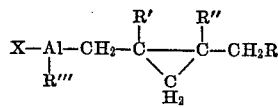

gives rise to the formation of compounds of the formula:

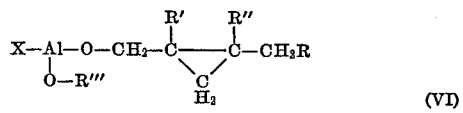

wherein the reaction conditions and the identifications of R, R', R" and R''' and X are as set forth with reference to the products of Formula V above.

Hydrolysis of the compounds of Formulas V and VI using conditions of the type described above results in the formation and liberation of carbinols having the corresponding skeletal configurations. Thus, hydrolysis of the compounds of Formula V yields substituted 3-buten-1-ols:

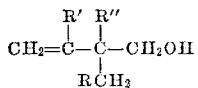

and hydrolysis of compounds of the Formula VI produce substituted cyclopropylcarbinols:

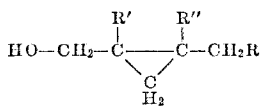

wherein R, R' and R" have the meanings assigned to them above. These substituted cyclopropylcarbinols are of particular interest in that they serve as intermediates for the synthesis of a variety of novel and useful products. For example, they may be esterified with carboxylic acids to produce esters having unusual properties. In addition, they may be reacted with $PCl_3$, $POCl_3$ and $PSCl_3$ to give phosphite (phosphonate), phosphate and thionophosphate esters having interesting properties. For example, these phosphorus esters may find use as insecticides, fungicides, extreme pressure additives, ignition control additives for gasoline, lubricating oil additives, flame retardants, and the like.

I claim:

1. A process which comprises reacting an organoaluminum compound containing an aluminacyclopent-3-ene moiety with a primary hydrocarbyl monohalide and hydrolyzing the organoaluminum halide product so obtained to produce a hydrocarbon product.

2. The process of claim 1 wherein the halogen atom of said monohalide is chlorine, bromine or iodine.

3. The process of claim 1 wherein the primary hydrocarbyl monohalide is one in which the halogen atom is chlorine, bromine, or iodine.

4. The process of claim 1 wherein the primary hydrocarbyl monohalide is an allylic monohalide in which the halogen atom is chlorine, bromine or iodine.

5. The process of claim 1 wherein the primary hydrocarbyl monohalide is allyl bromide.

6. The process of claim 1 wherein the primary hydrocarbyl monohalide is allyl chloride.

7. The process of claim 1 wherein the primary hydrocarbyl monohalide is allyl iodide.

8. The process of claim 1 wherein the hydrolysis is effected at a temperature sufficiently high to enhance the proportion in the hydrocarbon product of substituted cyclopropane relative to substituted olefin.

9. The process of claim 1 wherein the hydrolysis is effected at a temperature sufficiently low to enhance the proportion in the hydrocarbon product of substituted olefin relative to substituted cyclopropane.

References Cited

UNITED STATES PATENTS

| | | | |
|---|---|---|---|
| 2,862,981 | 12/1958 | Bain et al. | 260—666 A |
| 3,096,384 | 7/1963 | Logan | 260—680 |
| 3,131,169 | 4/1964 | Norton | 260—88 Z |
| 3,167,594 | 1/1965 | Köster et al. | 260—666 P |
| 3,259,665 | 7/1966 | Ketley | 260—666 PY |
| 3,355,481 | 11/1967 | Olechowski | 260—468 |
| 3,515,761 | 6/1970 | Hoffman et al. | 260—666 R |

DELBERT E. GANTZ, Primary Examiner

V. O'KEEFE, Assistant Examiner

U.S. Cl. X.R.

260—666 A, 666 R, 668, 677

PO-1050
(5/69)

UNITED STATES PATENT OFFICE
CERTIFICATE OF CORRECTION

Patent No. 3,770,840                Dated November 6, 1973

Inventor(s)    Lawrence H. Shepherd, Jr.

It is certified that error appears in the above-identified patent and that said Letters Patent are hereby corrected as shown below:

Column 19, line 37 through Column 20, line 2, delete Claim 3.

Signed and sealed this 12th day of November 1974.

(SEAL)
Attest:

McCOY M. GIBSON JR.                C. MARSHALL DANN
Attesting Officer                 Commissioner of Patents